US012718558B2

(12) United States Patent
Harikumar et al.

(10) Patent No.: US 12,718,558 B2
(45) Date of Patent: Aug. 25, 2026

(54) SYSTEM AND METHOD FOR VEGETATION DETECTION FROM AERIAL PHOTOGRAMMETRIC MULTISPECTRAL DATA

(71) Applicant: THE GOVERNING COUNCIL OF THE UNIVERSITY OF TORONTO, Toronto (CA)

(72) Inventors: Aravind Harikumar, Mississauga (CA); Ingo Ensminger, Oakville (CA)

(73) Assignee: THE GOVERNING COUNCIL OF THE UNIVERSITY OF TORONTO, Toronto (CA)

( * ) Notice: Subject to any disclaimer, the term of this patent is extended or adjusted under 35 U.S.C. 154(b) by 483 days.

(21) Appl. No.: 18/553,694

(22) PCT Filed: Apr. 9, 2022

(86) PCT No.: PCT/CA2022/050555
§ 371 (c)(1),
(2) Date: Oct. 2, 2023

(87) PCT Pub. No.: WO2022/213218
PCT Pub. Date: Oct. 13, 2022

(65) Prior Publication Data

US 2024/0193938 A1 Jun. 13, 2024

Related U.S. Application Data

(60) Provisional application No. 63/172,310, filed on Apr. 8, 2021.

(30) Foreign Application Priority Data

Apr. 9, 2021 (SE) .................................... 2150447-7

(51) Int. Cl.
*G06V 20/10* (2022.01)
*G06T 5/70* (2024.01)
*G06V 10/34* (2022.01)

(52) U.S. Cl.
CPC .............. *G06V 20/188* (2022.01); *G06T 5/70* (2024.01); *G06V 10/34* (2022.01); *G06V 20/194* (2022.01);

(Continued)

(58) Field of Classification Search
CPC .... G06V 20/188; G06V 10/34; G06V 20/194; G06V 20/17; G06T 5/70;

(Continued)

(56) References Cited

U.S. PATENT DOCUMENTS

| | | | |
|---|---|---|---|
| 8,655,070 B1 | 2/2014 | Yang et al. | |
| 12,276,731 B2 * | 4/2025 | Yun ...................... | G06V 20/188 |
| 2016/0292626 A1 | 10/2016 | Green et al. | |

OTHER PUBLICATIONS

A. Harikumar, F. Bovolo and L. Bruzzone, “A Local Projection-Based Approach to Individual Tree Detection and 3-D Crown Delineation in Multistoried Coniferous Forests Using High-Density Airborne LiDAR Data” (Year: 2019).*

(Continued)

*Primary Examiner* — Vu Le
*Assistant Examiner* — Zaid Muhammad Saleh
(74) *Attorney, Agent, or Firm* — Marc Lampert; Bhole IP Law

(57) ABSTRACT

Systems and methods for vegetation detection from aerial photogrammetric multispectral data. The method includes: detecting apexes in a height model using Local Maxima (LM) detection; detecting vegetation as detected apexes; performing orthorectification to derive an orthomosaic; generating a fractional map of a vegetation class by applying a Fuzzy classifier on the orthomosaic using the detected vegetation to define the class; generating a binary ridge map (Continued)

using the height model to identify ridges; combining the binary ridge map and the fractional map of the vegetation class to generate a ridge integrated fractional map; performing delineation of individual vegetation on the ridge integrated fractional map on a vegetation class using an active contour algorithm; and outputting the delineated vegetation.

20 Claims, 10 Drawing Sheets

(52) U.S. Cl.
CPC ............... *G06T 2207/10028* (2013.01); *G06T 2207/10036* (2013.01); *G06T 2207/20116* (2013.01); *G06T 2207/20156* (2013.01); *G06T 2207/30188* (2013.01)

(58) Field of Classification Search
CPC . G06T 2207/10028; G06T 2207/10036; G06T 2207/20116; G06T 2207/30188; G06T 7/11; G06T 7/149; G06T 7/174; G06T 2207/20152
See application file for complete search history.

(56) References Cited

OTHER PUBLICATIONS

J. Yang, Z. Kang, S. Cheng, Z. Yang and P. H. Akwensi, "An Individual Tree Segmentation Method Based on Watershed Algorithm and Three-Dimensional Spatial Distribution Analysis From Airborne LiDAR Point Clouds" (Year: 2020).*
A. Harikumar, P. D'Odorico and I. Ensminger, "A Fuzzy Approach to Individual Tree Crown Delineation in Uav Based Photogrammetric Multispectral Data". (Year: 2020).*
Han L, Yang G, Dai H, Yang H, Xu B, Feng H, Li Z, Yang X. Fuzzy Clustering of Maize Plant-Height Patterns Using Time Series of UAV Remote-Sensing Images and Variety Traits. (Year: 2019).*
Naveed, F., Hu, B., Wang, J., & Hall, G. B. (2019). Individual Tree Crown Delineation Using Multispectral LiDAR Data. Sensors, 19(24), 5421. https://doi.org/10.3390/s19245421 (Year: 2019).*
C.-C. Wu, Y.-L. Wu, C.-Y. Wu and C. Lin, "A gradient vector flow snake based multi-level morphological active contour algorithm," 2017 IEEE International Geoscience and Remote Sensing Symposium (IGARSS), Fort Worth, TX, USA, 2017, pp. 5806-5809, doi: 10.1109/IGARSS.2017.8128328. (Year: 2017).*
X. Zhou and X. Zhang, "Individual Tree Parameters Estimation for Plantation Forests Based on UAV Oblique Photography," in IEEE Access, vol. 8, pp. 96184-96198, 2020, doi: 10.1109/ACCESS.2020.2994911 (Year: 2020).*
International Search Report for PCT application No. PCT/CA2022/050555, CIPO, search completed: May 20, 2022, mailed: Jun. 9, 2022.
Office Action for Swedish application No. 2150447-7, Swedish Patent and Registration Office, dated: Oct. 13, 2021.
Written Opinion of the International Searching Authority for PCT application No. PCT/CA2022/050555, CIPO, opinion completed: May 24, 2022, mailed: Jun. 9, 2022.
Diez, Yago , et al., "A Preliminary Study on Tree-Top Detection and Deep Learning Classification Using Drone Image Mosaics of Japanese Mixed Forests", (Feb. 2020). In International Conference on Pattern Recognition Applications and Methods (pp. 64-86). Springer, Cham.
Harikumar, Aravind , et al., "A fuzzy approach to individual tree crown delineation in UAV based photogrammetric multispectral data", IGARSS 2020—2020 IEEE International Geoscience and Remote Sensing Symposium, IEEE, 2020, pp. 4132-4135.
Koc-San, Dilek , et al., "Automatic citrus tree extraction from UAV images and digital surface models using circular Hough transform", (2018). Computers and electronics in agriculture, 150, 289-301. https://doi.Org/10.1016/j.compag.2018.05.001.
Wang, Le , et al., "Individual tree-crown delineation and treetop detection in high-spatial-resolution aerial imagery", Photogrammetric Engineering & Remote Sensing, vol. 70, No. 3, Mar. 2004, pp. 351-357.
Xu, Chenyang , et al., "Gradient vector flow: A new external force for snakes", Proceedings of IEEE computer society conference on computer vision and pattern recognition, IEEE, Jun. 17, 1997, pp. 66-71.
Zhou, Xuemei , et al., "Individual tree parameters estimation for plantation forests based on UAV oblique photography", (2020). IEEE Access, 8, 96184-96198.

* cited by examiner

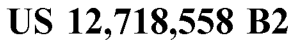
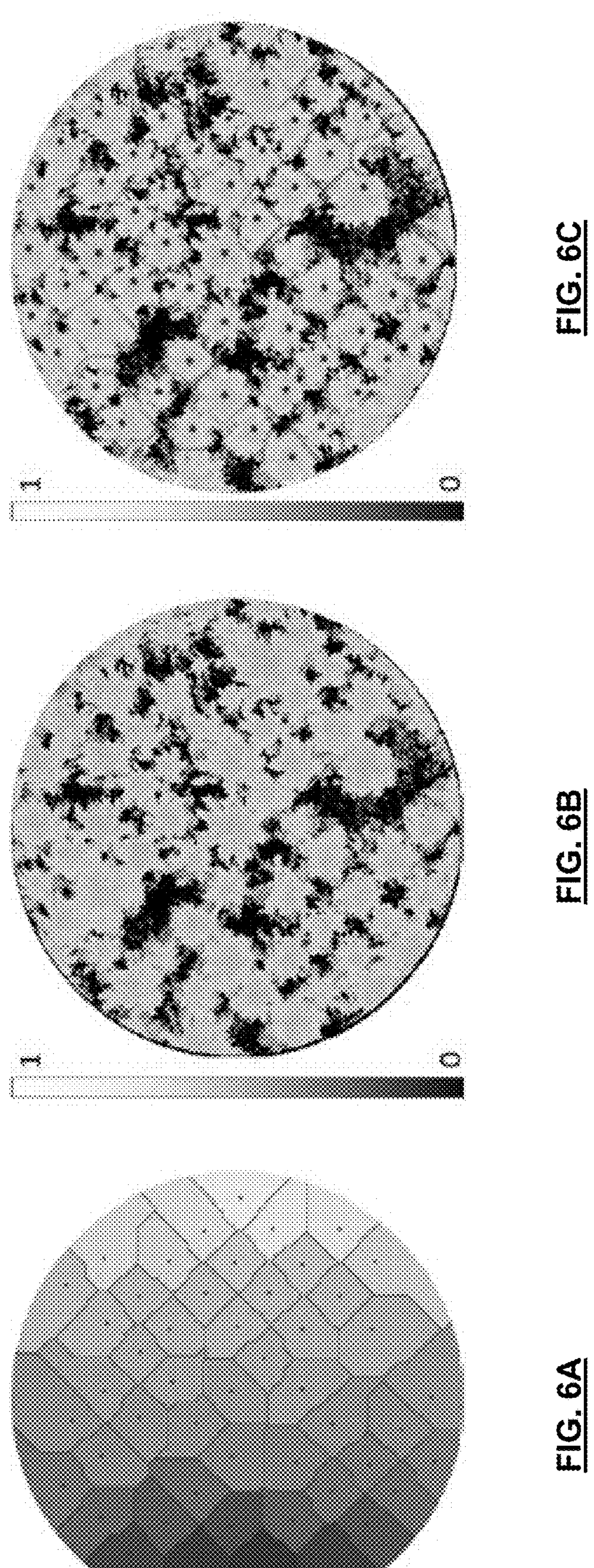
FIG. 6C
FIG. 6B
FIG. 6A

SYSTEM AND METHOD FOR VEGETATION DETECTION FROM AERIAL PHOTOGRAMMETRIC MULTISPECTRAL DATA

TECHNICAL FIELD

The following relates generally to data processing; and more specifically, to a system and method for vegetation detection from aerial photogrammetric multispectral data.

BACKGROUND

Understanding of forests dynamics at the individual tree level is critical to sustainable forest management and precision forestry operations. Error-free detection and delineation of individual tree crowns ensure accurate estimation of biophysical parameter such as height, biomass, leaf area index, and chlorophyll/carotenoids concentration. These properties can be used to perform management activities such as inventory collection, species classification, stress monitoring and genomic studies. Considering the huge area spanned by forests together with the variation in crown characteristics, conventional approaches to forest inventory collection based on manual field-surveying is costly and labour intensive.

SUMMARY

In an aspect, there is provided a computer-implemented method for vegetation detection from aerial photogrammetric multispectral data, the method comprising: receiving the aerial photogrammetric multispectral data capturing a plurality of vegetation; detecting apexes in a height model of the aerial photogrammetric multispectral data using Local Maxima (LM) detection; detecting vegetation as detected apexes above a predetermined threshold; performing orthorectification on the aerial photogrammetric multispectral data to derive an orthomosaic; generating a fractional map of a vegetation class by applying a Fuzzy classifier on the orthomosaic using the detected vegetation to define the class; generating a binary ridge map using the height model to identify ridges; combining the binary ridge map and the fractional map of the vegetation class to generate a ridge integrated fractional map; performing delineation of individual vegetation on the ridge integrated fractional map on a vegetation class using an active contour algorithm; and outputting the delineated vegetation.

In a particular case of the method, the method further comprising generating a dense three-dimensional point cloud using the aerial photogrammetric multispectral data and determining a Digital Surface Model (DSM) representative of surface geometry of the vegetation and a Digital Elevation Model (DEM) representative of underlying surface geometry from the dense three-dimensional point cloud, and wherein determining the height model comprises subtracting the DEM from the DSM.

In another case of the method, the method further comprising preprocessing the aerial photogrammetric multispectral data comprising: determining an orientation of the aerial photogrammetric multispectral data; generating a three-dimensional point cloud using the determined orientation; and determining the DSM and the DEM using the dense three-dimensional point cloud.

In yet another case of the method, the method further comprising generating a fractional map of a background class using the Fuzzy classifier on the orthomosaic, and removing values in the fractional map of the vegetation class when the membership of the respective value is more likely to be in the background class.

In yet another case of the method, the Fuzzy classifier comprises a Fuzzy C-Means classifier that uses a Markov-Random Field based spatial-contextual model (FCM-MRF).

In yet another case of the method, the vegetation class in the ridge integrated fractional map is determined as having a mean spectral value most proximal to a coarse mean spectral value, the coarse mean spectral value determined from the aerial photogrammetric multispectral data by averaging a predetermined number of brightest pixel values proximal to the detected apexes.

In yet another case of the method, the active contour algorithm comprises a Gradient Vector Field (GVF) snake algorithm.

In yet another case of the method, the GVF snake algorithm starts the delineation from a seed points set generated from a boundary of a circle with a center placed around a detected apex, and performs a finite number of iterations such that vertices of the circle are shifted toward boundaries of the vegetation.

In yet another case of the method, the method further comprising performing Gaussian smoothening on the height model.

In yet another case of the method, the vegetation comprises crops or trees.

In yet another case of the method, the vegetation comprises trees, the height model comprises a crown height model for crowns of the trees, and the detected apexes comprise detected tree tops.

In another aspect, there is provided a system for vegetation detection from aerial photogrammetric multispectral data, the aerial photogrammetric multispectral data capturing a plurality of vegetation, the system comprising one or more processors and a data storage, the one or more processors in communication with the data storage and configured to execute: a preprocessing module to receive the aerial photogrammetric multispectral data, and to perform orthorectification on the aerial photogrammetric multispectral data to derive an orthomosaic; a detection module to detect apexes in a height model of the aerial photogrammetric multispectral data using Local Maxima (LM) detection, and to detect vegetation as detected apexes above a predetermined threshold; and a delineation module to: generate a fractional map of a vegetation class by applying a Fuzzy classifier on the orthomosaic using the detected vegetation to define the class; generate a binary ridge map using the height model to identify ridges; combine the binary ridge map and the fractional map of the vegetation class to generate a ridge integrated fractional map; perform delineation of individual vegetation on the ridge integrated fractional map on a vegetation class using an active contour algorithm; and output the delineated vegetation.

In a particular case of the system, the preprocessing module further generates a dense three-dimensional point cloud using the aerial photogrammetric multispectral data and determining a Digital Surface Model (DSM) representative of surface geometry of the vegetation and a Digital Elevation Model (DEM) representative of underlying surface geometry from the dense three-dimensional point cloud, and wherein determining the height model comprises subtracting the DEM from the DSM.

In another case of the system, the preprocessing module further preprocesses the aerial photogrammetric multispectral data comprising: determining an orientation of the aerial photogrammetric multispectral data; generating a dense three-dimensional point cloud using the determined orientation; and determining the DSM and the DEM using the dense three-dimensional point cloud.

In yet another case of the system, the delineation module further generates a fractional map of a background class using the Fuzzy classifier on the orthomosaic, and removes values in the fractional map of the vegetation class when the membership of the respective value is more likely to be in the background class.

In yet another case of the system, the Fuzzy classifier comprises a Fuzzy C-Means classifier that uses a Markov-Random Field based spatial-contextual model (FCM-MRF).

In yet another case of the system, the vegetation class in the ridge integrated fractional map is determined as having a mean spectral value most proximal to a coarse mean spectral value, the coarse mean spectral value determined from the aerial photogrammetric multispectral data by averaging a predetermined number of brightest pixel values proximal to the detected apexes.

In yet another case of the system, the active contour algorithm comprises a Gradient Vector Field (GVF) snake algorithm.

In yet another case of the system, the GVF snake algorithm starts the delineation from a seed points set generated from a boundary of a circle with a center placed around a detected apex, and performs a finite number of iterations such that vertices of the circle are shifted toward boundaries of the vegetation.

In yet another case of the system, the detection module further performs Gaussian smoothening on the height model.

In yet another case of the system, the vegetation comprises trees, the height model comprises a crown height model for crowns of the trees, and the detected apexes comprise detected tree tops.

These and other aspects are contemplated and described herein. It will be appreciated that the foregoing summary sets out representative aspects of systems and methods to assist skilled readers in understanding the following detailed description.

BRIEF DESCRIPTION OF THE DRAWINGS

The features of the invention will become more apparent in the following detailed description in which reference is made to the appended drawings wherein:

FIG. 6A illustrates an example of a Marker-controlled Watershed segmentation using tree tops shown as dots, to detect the watershed regions shown as blocked regions;

FIG. 6B illustrates an example of a fractional map of a crown class;

FIG. 6C illustrates an example of a Ridge-integrated fractional map generated by element-wise multiplication;

DETAILED DESCRIPTION

Figure 1:
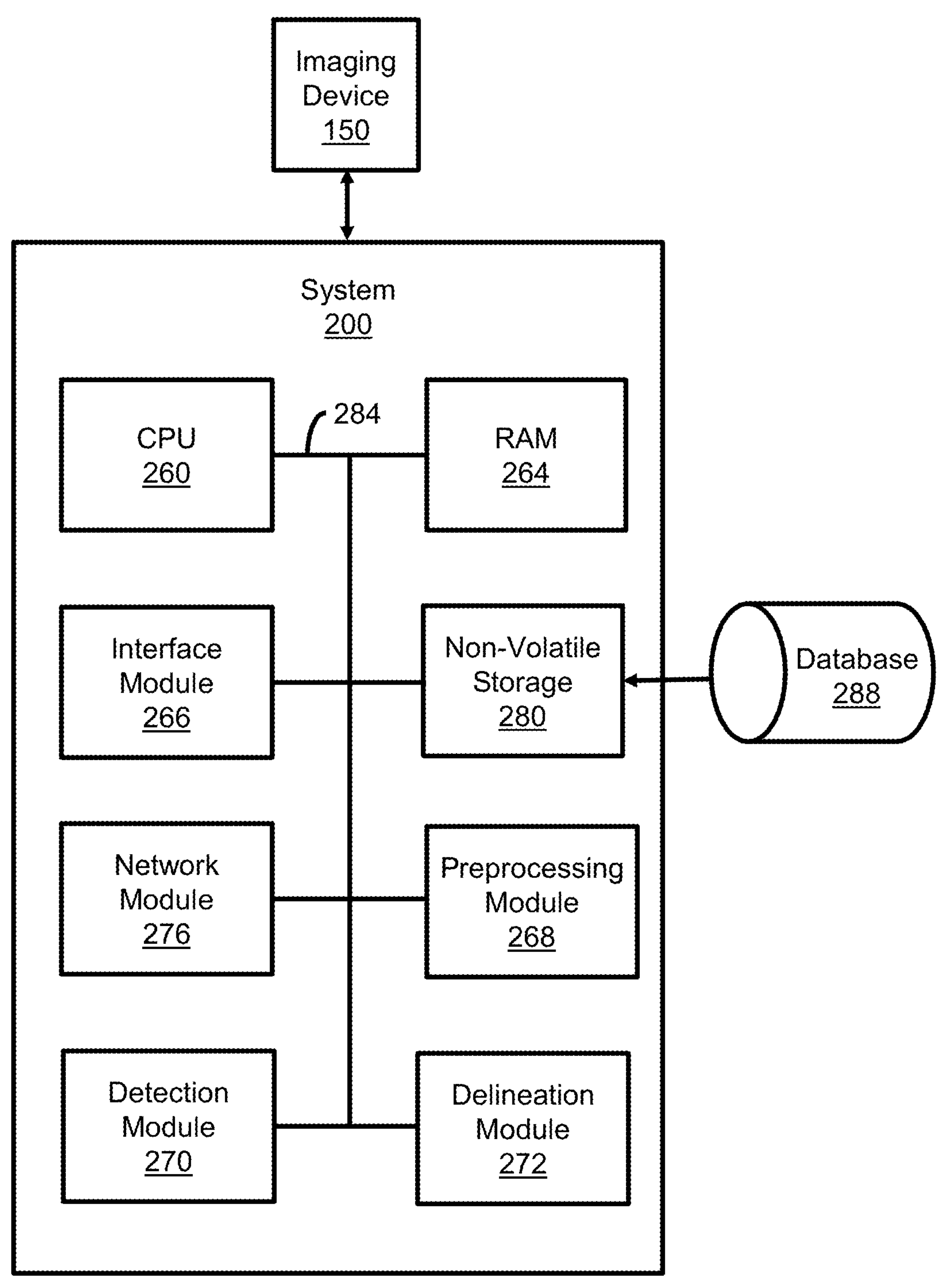
FIG. 1 is a schematic diagram of a system for vegetation detection from aerial photogrammetric multispectral data, according to an embodiment.

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

The following relates generally to data processing; and more specifically, to a system and method for vegetation detection from aerial photogrammetric multispectral data.

Error-free detection and delineation of individual tree crowns in forests is very useful for accurate estimation of biophysical parameter such as height and biomass, health assessment, species classification, and tree genomic studies. Considering the huge area spanned by global forests together with the variation in crown characteristics, approaches to forest inventory based on field-surveying are often uneconomical in terms of both time and money. Thus, forest monitoring using data collected by remote sensors on-board airborne platforms is a cost-effective alternative to cover large areas in minimum time. In particular, mounting optical sensors on remotely piloted unmanned aerial vehicles (UAVs) provides an efficient approach to acquire tree-level data with high spatial, spectral and temporal resolution. The relatively low flight-time associated with UAVs in comparison to other remote sensing platforms allows quick capture of forest data with large swath overlap; hence opening up the possibility to derive accurate two-dimensional (2D) and three-dimensional (3D) crown structural information from images using photogrammetric techniques.

Forest parameter estimation can be performed using a number of data collection approaches, such as, by using remote sensors on-board flying platforms. Such approaches provide a cost-effective solution to scan large areas in minimal time. Data collected from sensors onboard high-altitude platforms, such as satellite and aeroplanes, however, often lack detailed information for accurately estimating parameters such as leaf area index, water content and chlorophyll. In contrast, mounting optical sensors on remotely-piloted low-flying unmanned aerial vehicles (UAVs or 'drones'), referred to as UAV remote sensing, provides an efficient approach to acquire tree-level data. Some approaches to UAV remote sensing rely on very-high-resolution data for tree trait-mapping and use spectral details, but do not, or minimally, exploit spatial information that can be derived from the data to detect and delineate tree crowns. The large spectral variance in very-high-resolution data together with the effects of non-uniform illumination and shadowing of the crowns, makes accurate crown delineation challenging in the case of such approaches.

In some approaches, individual tree detection in forests can be performed on high-resolution (≤1 metre) multispectral data using a Local Maxima (LM) detection approach; under the assumption that tree tops have the maximum brightness in the crown area. However, the performance of such an approach is often affected by large spectral variance in crowns and change in the Sun angle. Multiscale and morphological analysis on high-resolution data, together with the use of smoothening filter to minimize crown spectral variance and varying size of the LM search window to detect smaller trees, improves accuracy of tree detection by minimizing both the omission and the commission errors. Object-oriented approaches, such as template matching that jointly considers crown parameters, such as the shape, size and texture of crowns, are also other approaches. In these cases, tree-top localization from spectral data of crown is limited in its capacity to quantify crown structural attributes such as the height and the texture. Thus, photogrammetric techniques such as Structure-from-Motion (SfM) and the Multi-View Stereopsis (MVS) can be employed to derive 3D point cloud of the visible-canopy from image stereo-pairs. Canopy Height Models (CHM) derived from the 3D point cloud are minimally affected by crown spectral variance and non-uniform illumination/shadowing, and hence, tree top detection in CHM can be performed using LM detection and a Pouring algorithm.

Individual crown delineation in the context of optical data refers to mapping and grouping of the pixels that correspond to a tree. Various approaches for delineating crowns in optical data can be used; for example, based on valley following, watershed segmentation, region-growing, multi-scale, and object-oriented analysis. High-resolution multispectral data contains details of crown components including branches, twigs and leaves, together with undesirable effects of varying illumination/shadow, resulting in large variation in pixel values within a crown. However, most approaches for crown delineation assume a spectrally homogeneous crown, which can only be deemed realistic in the case of low and medium resolution data. Thus, preprocessing that minimizes crown heterogeneity is very beneficial to accurate crown delineation. Although employing technique such as the Gaussian smoothening mitigates the spectral heterogeneity in the data, it results in information loss at the crown edges. By grouping pixels belonging to a tree-object, object-oriented crown delineation approaches use template matching, multi-resolution analysis, and hierarchical-segmentation to mitigate the spectral heterogeneity in crowns. In some cases, the crown spectral heterogeneity problem in high-resolution multispectral data can be addressed by performing marker controlled watershed-segmentation on the morphologically-smoothened bias field estimate. However, the deriving edge mask using the Sobel filter can result in inaccurate crown boundary delineation in dense forests with proximal and or overlapping crowns. Advantageously, the present embodiments provide a crown delineation approach that is robust to the effect of crown spectral heterogeneity and non-uniform illumination/shadowing in UAV based very-high-resolution multispectral data.

Advantageously, the present embodiments exploit very high-resolution photogrammetric multispectral data to minimize crown delineation errors, especially in comparison to other approaches. In embodiments of the present disclosure, a fuzzy framework can be used to minimize effects of crown spectral variance and non-uniform illumination and or shadowing, for accurate crown delineation. This approach provides more effective and accurate crown delineation than other approaches.

While the present disclosure is generally directed to tree delineation in forest settings, it is understood that the present embodiments can be applied to any suitable vegetation detection from aerial photogrammetric multispectral data; for example, crop delineation in farmer fields.

FIG. 1 illustrates a schematic diagram of a system 200 for vegetation detection from aerial photogrammetric multispectral data, according to an embodiment. As shown, the system has a number of physical and logical components, including a central processing unit ("CPU") 260, random access memory ("RAM") 264, an interface module 268, a network module 276, non-volatile storage 280, and a local bus 284 enabling CPU 260 to communicate with the other components. CPU 260 can include one or more processors. RAM 264 provides relatively responsive volatile storage to CPU 260. In some cases, the system 200 can be in communication with an imaging device 150, for example, a multispectral camera mounted on an UAV, via, for example, the interface module 268. The interface module 268 enables input to be provided; for example, directly via a user input device, or indirectly, for example via the imaging device 150. The network module 276 permits communication with other systems or computing devices; for example, over a local area network or over the Internet. Non-volatile storage 280 can store an operating system and programs, including computer-executable instructions for implementing the methods described herein, as well as any derivative or related data. In some cases, this data can be stored in a database 288. During operation of the system 200, the operating system, the programs and the data may be retrieved from the non-volatile storage 280 and placed in RAM 264 to facilitate execution. In other embodiments, any operating system, programs, or instructions can be executed in hardware, specialized microprocessors, logic arrays, or the like.

In an embodiment, the CPU 260 can be configured to execute a number of conceptual modules; such as a preprocessing module 268, the detection module 270, and the delineation module 272. In some cases, the interface module 266 and/or the network module 276 can be also executed on the CPU 260. In further cases, the functions of the various modules can be combined or performed by other modules.

Data received from high-resolution multispectral sensors mounted on compact Unmanned Aerial Vehicles (UAVs) can be used by the system 200 to rapidly collect detailed photogrammetric data of forests to be analyzed at the individual tree level. Accurate detection and delineation of individual tree crowns in the data are very beneficial for precision-forestry applications; for example, forest inventory parameter estimation, species classifications, stress response screenings and tree genomic studies, accurate biophysical parameter estimation, forest ecosystem modelling, and species classification. Other approaches tend to underexploit the spatial information, and rely mostly on the spectral features derived from the multispectral data to detect and delineate tree crowns. However, with such approaches, the large spectral variance in high-resolution data together with the effects of non-uniform illumination and shadowing of the crowns makes crown detection and delineation challenging. In contrast, the system 200, advantageously, maximally exploits both the spatial and the spectral information in high-resolution photogrammetric multispectral data to minimize crown delineation errors. In particular cases, the system 200 uses spectral information, spatial contextual information (such as those modelled using the Markov Random Field (MRF)), and three-dimensional (3D) canopy structure derived using photogrammetry. This spectral information is applied to a fuzzy framework to address the effect of crown spectral variance and non-uniform illumination and shadowing. In example experiments conducted by the present inventors, a higher overall shared crown-area index (88.0%) and a lower Diameter at Breast Height (DBH) estimation error (6.1 cm), applied to a Watershed segmentation, shows the present embodiments to be substantially effective in comparison to other approaches.

The individual vegetation crown data collected from the UAVs can be used for accurate vegetation trait mapping. For example, using UAVs to collect optical data of the vegetation, automatically extract information of individual trees or crops, and estimate tree-specific or crop-specific traits; for example, health, vigour, and resilience to environmental stress.

Figure 2:
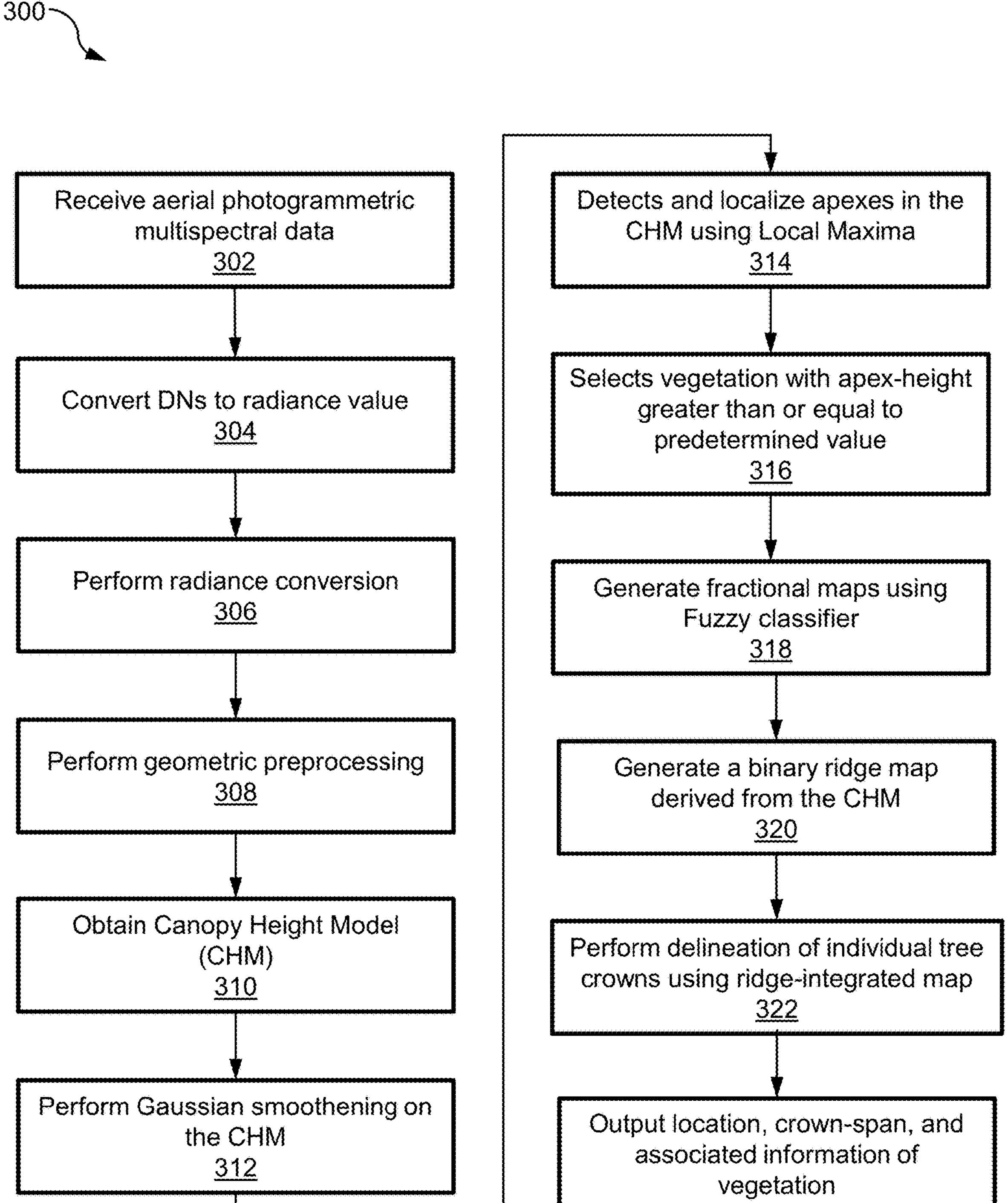
FIG. 2 is a flowchart for a method for vegetation detection and crown delineation from aerial photogrammetric multispectral data, according to an embodiment.
Figure 3:
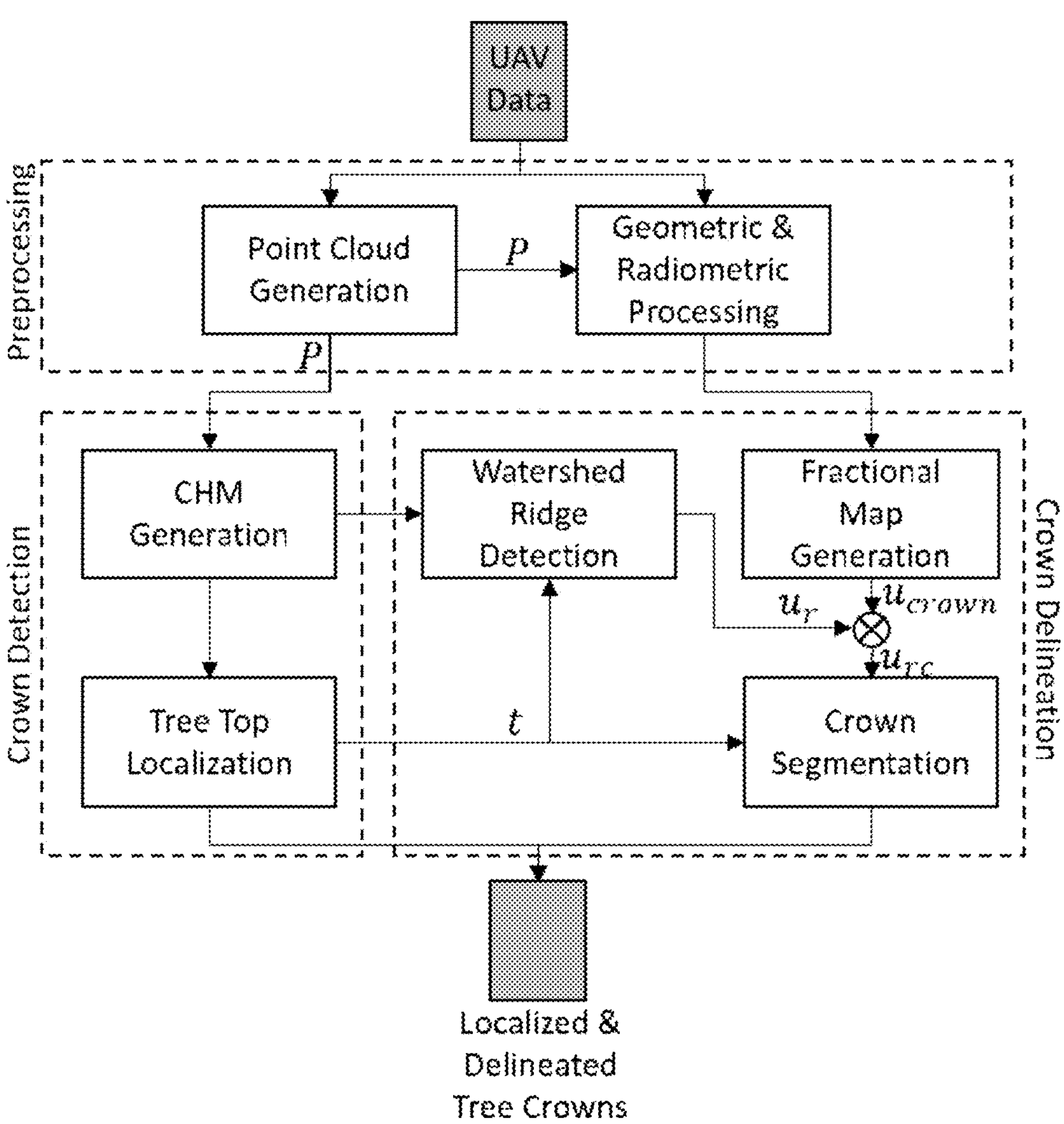
FIG. 3 is an example block scheme for the method of FIG. 2 in order to detect and delineate crown information.

Turning to FIG. 2, a method for vegetation detection from aerial photogrammetric multispectral data 300, according to an embodiment, is shown. The method 300 exploits both the 2D spectral information in the UAV aerial data, together with the crown structural information derived from the photogrammetrically-generated 3D point cloud, in a fuzzy framework, to achieve accurate crown detection and delineation. FIG. 3 illustrates an example block scheme for the method 300 in order to detect and delineate crown information.

At block 302, the preprocessing module 268 receives the aerial photogrammetric multispectral data from, for example, an imaging device 150 mounted on an UAV. The aerial photogrammetric multispectral data comprising multispectral data imaged of vegetation, such as a forest. The preprocessing, in some cases, can include radiometrically and geometrically preprocessing the aerial data to ultimately derive 3D digital surface maps and orthorectified images of tree crowns. In some cases, radiometric preprocessing can include: (a) digital numbers (DN) to radiance conversion aimed at removing sensor specific noise; and (b) radiance to reflectance conversion to remove effects of environmental conditions (due to cloud cover and sun angle) at the time of data acquisition. Radiometric preprocessing can be performed to ensure that the spectral responses of trees are comparable across different dates.

At block 304, by compensating for sensor black-level, the sensitivity of the sensor, sensor gain, exposure settings, and lens vignette effects, digital numbers (DNs) are converted by the preprocessing module 268 to a physically meaningful radiance value L by using:

$$L = V(x, y).\frac{a_1}{g} \cdot \frac{p - p_{BL}}{t_e + a_2 y - a_3 t_e y} \tag{1}$$

where p is the normalized raw DN number, $P_{BL}$ is the normalized dark pixel value, $a_1$, $a_2$ and $a_3$ are the radiometric calibration coefficients. $t_e$ is the exposure time, g is the sensor gain, x and y are the pixel locations, and L is the radiance.

At block 306, a reflectance conversion can be performed by the preprocessing module 268 by multiplying a flat and calibrated radiance aerial image by a scale factor determined using the radiance value of a surface with known reflectance.

At block 308, the preprocessing module 268 can perform geometric preprocessing by performing band to band registration, and a determination of the internal (e.g., camera and lens parameters) and external orientation (e.g., roll, pitch and yaw of the UAV platform at the time of data acquisition) of the aerial images. Band to band registration allows the preprocessing module 268 to remove any spatial mismatch in band data caused by the dynamic nature of the UAV during the data acquisition. The orientation estimates can be obtained by using photogrammetric techniques including triangulation, resection, self-calibration, and bundle adjustment. The internal and external parameters of each image allow the preprocessing module 268 to derive point-data (of the scanned area) for which the latitude, longitude and height information are available.

The preprocessing module 268 generates a huge number of such points all over the scanned area, to generate a dense point cloud that provides three-dimensional crown and ground surface maps. In particular, the points in the cloud which are lowest in the local neighbourhood are the ones most proximal to the ground, and hence, are classified as ground points, while the remaining points in the original dense cloud are classified as crown points. A Digital Surface Model (DSM) and a Digital Elevation Model (DEM) are generated by the preprocessing module 268 by interpolating the points belonging to the ground and crown class, respectively. The height of the tree crown is derived by the preprocessing module 268 from a Canopy Height Model (CHM), which is obtained by subtracting the DEM from the DSM.

At block 310, the preprocessing module 268 obtains a Canopy Height Model (CHM) that represents the canopy height by subtracting the DEM from the DSM. The tree geometry of crowns in the image is affected (e.g., stretched, squeezed or skewed) by various factors; for example, the distance of a tree from the camera, and the crown and ground surface relief.

Effects of relief on the preprocessed data can be compensated for by performing orthorectification on the raw images to derive the geometrically corrected image referred to as the orthomosoaic. FIG. 2 shows an example of a 3D point cloud, a CHM, and an orthomosoaic obtained for a sample circular plot of radius 10 m. The 3D dense point cloud and 2D orthomosoaic are jointly used to accurately delineate individual crowns.

The detection module 270 then detects individual plants from vegetation from the preprocessed aerial data; such as detecting crowns of trees in a forest. A tree top can be referred to as an apex location of a crown. The detection module 270 detects and localizes individual tree crowns first by, at block 312, performing a Gaussian smoothening on the CHM to remove artifacts caused due to vertical branches and dual apexes of trees. At block 314, the detection module 270 detects and localizes apexes in the CHM using a Local Maxima (LM) detection approach based on the assumption that tree tops manifest themselves as local maxima in the CHM. At block 316, the detection module 270 selects all trees that have an apex-height greater than or equal to $t_h$ in order to minimize the commission error caused by other lower objects in the scene. The value $t_h$ is estimated as the maximum height among all the ground points. The locations of the t trees detected are used for crown segmentation.

The delineation module 272 then delineates each individual tree crown using the tree crowns detected by the detection module 270. Crown delineation is performed by the delineation module 272 on the orthomosoaic using a Fuzzy classifier in order to minimize the effects of crown spectral variance and varied illumination on the delineation accuracy. In particular, both the spectral and spatial-contextual information in all the bands are exploited, together with the location of watershed ridges in the CHM, to perform accurate crown delineation.

The porous structural characteristics of crowns together with the effect of non-uniform illumination and shadowing caused by the varying Sun angle results in spectrally-impure pixels where the reflectance from multiple objects in the scene contributes to its digital number. Fuzzy classifiers use the concept of mixed-pixels to generate fractional images that represent the spatial likelihood of individual pixels in the image to belong to a class. At block 318, the delineation module 272, in an embodiment, uses a Fuzzy C-Means classifier that uses a Markov-Random Field based spatial-contextual model (FCM-MRF) to generate fractional maps $u_i$, $i \in \{u_1, u_2, \ldots, u_c\}$ $c_i$, $i \in 1, 2, \ldots C$ that are least affected by crown spectral variance and non-uniform illumination/shadowing; where C is the total number of classes. In other cases, other suitable fuzzy classifiers can be used. In an example, the images can be categorized into two broad classes: a) the crown and b) the background. Where, the crown class is composed of branches, twigs, and leaves, while the background class constitutes the remaining objects in the scene including soil and shadow. The fractional maps generated against the crown and the background classes are referred to as $u_{crown}$ and $u_{background}$, respectively.

The objective function of the FCM-MRF is a minimization problem that minimizes the posterior energy E of each image pixel by considering both the spectral similarity with respective class reference spectrum, the local crown height, and the spatial context of pixels:

$$E\left(\frac{u_{ij}}{d}\right) = (1-\lambda)\left[\sum_{i=1}^{N}\sum_{j=1}^{C}(u_{ij})^m\|\vec{x}_i - \vec{c}_i\|^2\right] + (\lambda)\left[\sum_{i=1}^{N}\sum_{j=1}^{C}\sum_{j \varepsilon N_\xi}\left(-\gamma e^{\frac{-\eta^2}{\gamma}}\right)\right] \tag{2}$$

where N is the total number of image pixels, C is the total number of classes, and m is the fuzzification index. All parameter updates are subjected to the constraint $$0 \leq \sum_{j=1}^{c} u_{ij} \leq 1,$$

$i \in \{1, N\}$ which ensures that the class membership values are effectively relaxed. Here, $N_\xi$ is the neighbourhood defined as $v_1(w_r)+v_2(w_r, w_{r'})+v_3(w_r, w_{r'}, w_{r''})$, where $v_1(w_r)$, $v_2(w_r, w_{r'})$ and $v_3(w_r, w_{r'}, w_{r''})$ represents the potential function corresponding to the single-site $w_r$, pair-site $w_{r'}$, and triple site $w_{r''}$ cliques, respectively. A clique is a neighbourhood pixel subset where individual members are mutual neighbours.

The first term in Equation (2) estimates the spectral similarity of a pixel to individual classes. While the second term is an adaptive potential function that estimates the influence of a pixel with its neighbours in $N_\xi$, where $\eta$ is the pixel value variance in $N_\xi$. A larger $\eta$ results in lower influence on neighbours, and vice-versa. Generally, higher $\eta$ occurs at crown boundaries, and hence causes minimum smoothing of the corresponding membership values in the fractional map. The influence of the spectral and the spatial components in determining the class membership is controlled by $\lambda$, and $\gamma$ controls the smoothening strength.

The delineation module 272 estimates the global posterior energy U by minimizing Equation (2) using a Simulated Annealing optimization algorithm by modifying $u_{ij}$ and $\vec{c}_j$ using Equation (3) and Equation (4), respectively:

$$u_{ij} = \frac{1}{\sum_{k=1}^{C}\left(\frac{D(\vec{x}_i, \vec{c}_j)}{D(\vec{x}_i, \vec{c}_k)}\right)^{\frac{1}{m-1}}}, 1 \le j \le C \quad (3)$$

$$\vec{c}_j = \frac{\sum_{i=1}^{N} u_{ij}^m \vec{x}_i}{\sum_{i=1}^{N} u_{ij}^m}, 1 \le j \le C \quad (4)$$

The optimized fractional maps $u_{crown} \in u$ and $u_{background} \in u$ represent the likelihood of a pixel to belong to the crown and the background class respectively. The delineation module removes undesirable background class membership variance by assigning 0 to all the pixel membership values in $u_{crown}$ when the respective $u_{crown} \le u_{background}$.

In some cases, crown delineation using only $u_{crown}$ can become challenging when there is no detectable variation in the likelihood values $u_{ij}$ at the crown boundaries. Such situations occur in the case of proximal and/or overlapping crowns. Thus, the crown surface variation represented by the CHM is exploited to identify ridges at the overlapping regions. Individual pixels in CHM $b_i$, $i \in [0,N]$ represent the $i^{th}$ pixel height, and hence, at block 320, the delineation module 272 generates a binary ridge map $u_r$ derived from the CHM because it is an effective approach to locate crown boundaries and/or valley points at the intersection of two neighbouring crowns. The ridge map $u_r$ is derived by: (a) performing a marker-controlled watershed segmentation algorithm on the CHM, with the tree-tops locations derived corresponding to the local-maxima in the CHM as seed points; and (b) assigning maximum membership value (i.e., 1) to all the pixels watershed areas in $u_r$, and minimum membership value (i.e., 0) to all the ridge pixels in $u_r$. A pixel-wise multiplication of the ridge map $u_r$ and the $u_{crown}$ is performed to generate the ridge integrated fractional map $u_{rc}$. Ridges occur at the crown boundaries of all proximal trees, and the pixel-wise multiplication forces all the pixels in $u_{crown}$ at the ridge location to have the minimum membership value of 0.

At block 322, the delineation module 272 performs delineation of individual tree crowns on the ridge integrated fractional map $u_{rc}$ of the crown class. The vegetation class is selected as the one that has its mean spectral value most proximal to the mean spectral value of the vegetation-class that is automatically derived from the multispectral data by averaging l brightest pixel values proximal to the tree top. In an example, a Gradient Vector Field (GVF) Snake algorithm (also called as the Active Contour algorithm) can be used to perform crown segmentation in very-high-resolution multispectral data. The GVF Snake algorithm is beneficial for its tolerance to pixel heterogeneity within crown area, and for its ability to map complex crown shapes without resulting in over-segmentation. However, any suitable segmentation algorithm can be used.

The GVF Snake algorithm detects object boundaries by iteratively minimizing the energy E of a curve f(s)=[x(s), y(s)], $s \in [0,1]$ in the spatial domain $R^2$ of the input image. The objective energy function of the GVF Snake algorithm is:

$$E = \int_0^1 \frac{1}{2}\left(\alpha|f'(s)|^2 + \beta\left|f''(s)\right|^2 + E_{ext}(f(s))ds\right. \quad (5)$$

At minimum energy state, Equation (5) must satisfy the Euler equation as shown in Equation (6):

$$\alpha f''(s) - \beta f''''(s) + \Delta E_{ext} = 0 \quad (6)$$

The above can be viewed as a force balance equation $F_{int}+F_{ext}=0$, where $F_{int}=\alpha x''(s)-\beta x''''(s)$ and $F_{ext}=-\Delta E_{ext}$ are the internal and external forces acting on the curve. On the one hand, the internal force $F_{int}$ resists the stretching and bending of the curve, while on the other hand the external force $F_{ext}$ pulls the snake towards the image boundary. Here, the edge map e(x,y) derived from image $u_{crown}$ (x,y) is used as the $-E_{ext}$.

The Gradient Vector Field (GVF), g(x,y)=(v(x,y), w(x, y)), is the equilibrium solution that minimizes the energy function in Equation (7):

$$\epsilon = \int\int \mu\left(v_x^2 + v_y^2 + w_x^2 + w_y^2\right) + |\Delta e|^2|g - \Delta e|^2 dxdy \quad (7)$$

where, the first and second terms represent the partial derivatives of the vector field, and the gradient field of the edge map $$f(x, y) = -E_{ext}^i(x, y), i = 1, 2, 3, 4,$$

respectively.

The regularization parameter u controls the contributions from first and second term. The GVF can be iteratively solved by treating v and w as time variant parameters, using Equation (8) and Equation (9):

$$v_t(x, y, t) = \mu\Delta^2 v(x, y, t) - (v(x, y, t) - e_x(x, y)). \left(e_x(x, y)^2 - e_y(x, y)^2\right) \quad (8)$$

$$w_t(x, y, t) = \mu\Delta^2 w(x, y, t) - (w(x, y, t) - e_y(x, y)). \left(e_x(x, y)^2 - e_y(x, y)^2\right) \quad (9)$$

The computed g can be used as an external potential force in Equation (6):

$$x_t(s, t) = \alpha x''(s, t) - \beta x''''(s, t) + g \quad (10)$$

The partial derivative of x with respect to time is equated to the RHS term in Equation (10), and is solved iteratively by discretizing. The parametric curve obtained by the delineation module 272 is referred to as the GVF snake. The delineation module 272 starts the segmentation from a seed points set S generated from the boundary of the circle with center $c_i$ and radius $r_i$ placed around the tree top $t_i$. With a finite number of iterations h, the vertices of the seed circle are shifted toward the boundaries of the crown resulting in a contour that captures the 2D crown span. As described herein, the Gradient Vector Field is determined as g(x,y)=(v(x,y), w(x,y)), and therefore, g changes as the v and w values are updated using Equations (8) and (9); thus, controlling the shape of the boundary curve.

At block 324, the delineation module 272 outputs the location and associated information of the detected and delineated vegetation to the interface module 266, the network module 276 of the database 288. In some cases, the delineation module 272 also outputs the crown-span information.

In order to investigate the advantages of the present embodiments, the present inventors conducted example experiments. The studied area of the example experiments was a mature forest located at Saint-Casimir in the province of Quebec in southern Canada (46°. 70'N−72°. 11'E). The study area included both managed and unmanaged forests. The white spruce is the dominant species in the managed part of the forest, while the unmanaged part has trees from white spruce, pines and white oak species. Multispectral images from five narrow bands in the visible and the near-infrared regions of the electromagnetic spectrum were acquired using a camera mounted on a quadrocopter. Images were acquired for a 0.11 square km area, with at least 75% overlap and sidelap between swaths in order to facilitate automatic tie-point detection. The flying height of 45 m above canopy provided an average Ground Sampling Distance (GSD) of 3.2 cm. Experiments were conducted on two datasets derived from the orthomosaic. The first set is a set of six circular plots of 10 m radius for which tree tops and crown boundaries were manually identified by an expert operator using both the orthomosaic and the DSM generated from the dense point cloud. The plot-wise basic statistics of tree height and maximum crown diameter are shown in TABLE 1. The second set is a dataset composed of individual trees for which location, height and Diameter at Breast Height (DBH) attributes were collected from a field campaign. The basic statistics of tree height and DBH for the 100 trees are shown in TABLE 2.

TABLE 1

| Plot ID | Number of Trees | Tree height (m) Max | Min | Mean | Crown diameter (m) Max | Min | Mean |
|---|---|---|---|---|---|---|---|
| Plot1 | 33 | 8.4 | 3.3 | 6.6 | 3.9 | 1.4 | 2.4 |
| Plot2 | 54 | 8.9 | 3.6 | 6.7 | 3.4 | 1.5 | 2.9 |
| Plot3 | 49 | 10.0 | 4.9 | 7.8 | 4.0 | 1.6 | 3.4 |
| Plot4 | 56 | 9.3 | 4.6 | 6.8 | 4.4 | 1.1 | 3.8 |
| Plot5 | 55 | 9.1 | 4.3 | 6.9 | 3.7 | 1.7 | 3.3 |
| Plot6 | 47 | 9.3 | 5.4 | 7.4 | 4.2 | 1.2 | 2.9 |

TABLE 2

| Number of Trees | Tree height (m) Max | Min | Mean | Crown diameter (m) Max | Min | Mean |
|---|---|---|---|---|---|---|
| 100 | 10.1 | 2.9 | 8.3 | 3.7 | 0.3 | 1.2 |

Figures 4A, 4B, 4C:
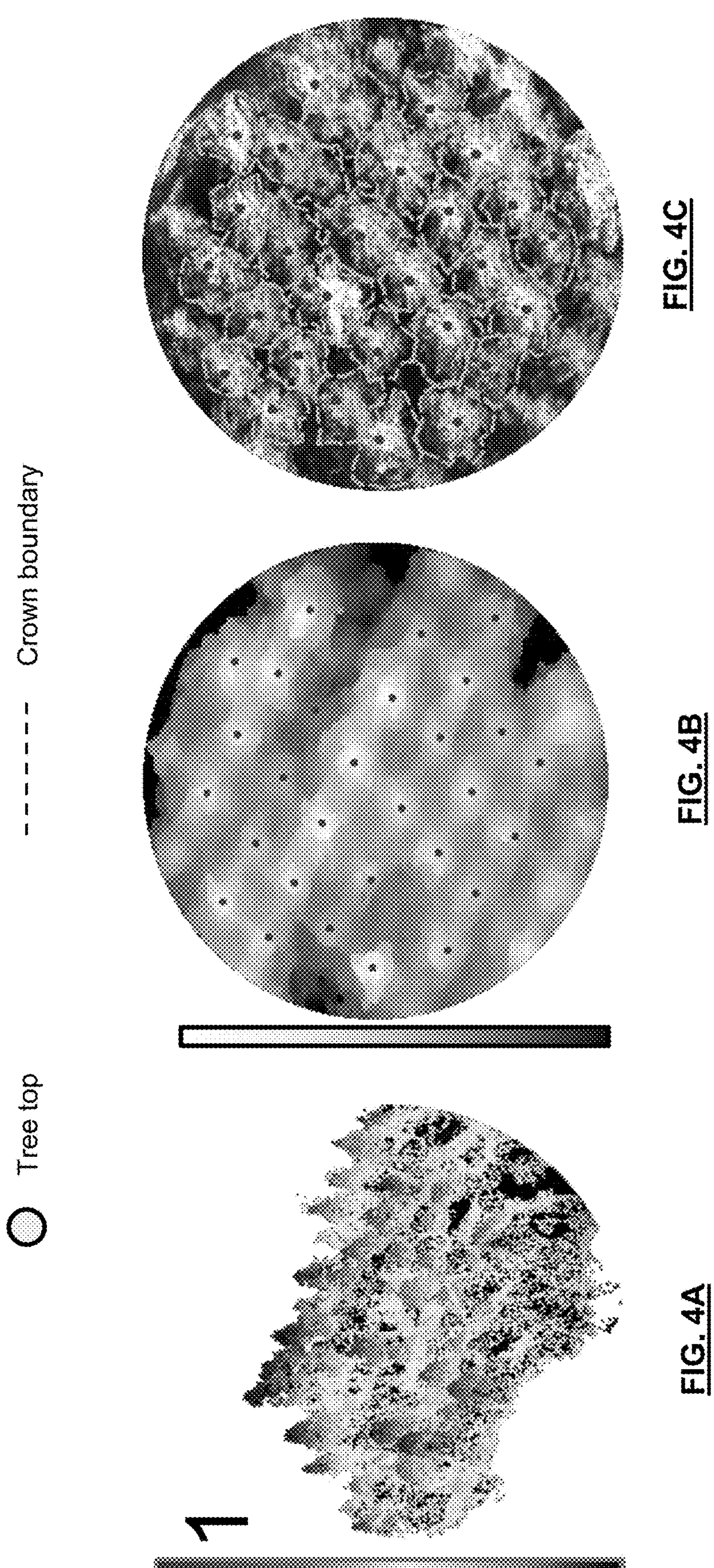
FIG. 4A illustrates an example of a dense three-dimensional (3D) point cloud generated for a sample plot.
FIG. 4B illustrates a Canopy Height Model generated based on the plot of FIG. 4A.
FIG. 4C illustrates a relief-corrected orthomosaic generated based on the Canopy Height Model of FIG. 4B.

The 3D programmatic point cloud and orthomosaic were derived by automatic feature detection and tie-point marching. Radiometric processing was used to convert Digital Numbers to reflectance using a 61% reflectance panel, which were imaged before the flight of the UAV. The image and the sensor orientation parameters required for the image alignment and sparse point cloud generation were estimated with high accuracy by selecting 40,000 and 4000 key points and tie points, respectively. An automatic outlier removal was performed on the sparse 3D cloud by removing 10% of the points with the largest reprojection errors. The aligned images had a mean standard deviation of 3 m for the sensor locations and a mean error of 3.2 pixels for the tie points. The dense point cloud representing the 3D forest area was generated with medium quality, and the resulting point cloud had a mean density of 96 points/m2. The orthomoasic generation was performed using high resolution DSM that represents 10 cm per pixel and was generated form the dense point cloud. FIGS. 4A to 4C show the CHM, the photgrammetically-derived 3D point cloud, and the orthomosaic for a sample circular plot of radius equal to 10 m. FIG. 4A illustrates an example of a 3D point cloud generated for a sample plot; FIG. 4B illustrates a Canopy Height Model generated based on the plot of FIG. 4A; and FIG. 4C illustrates a relief-corrected orthomosaic generated based on the Canopy Height Model of FIG. 4B.

The example experiments used two set of experiments to evaluate the performance of the present embodiments. The first set was performed on the six circular plots of varying complexity to access the crown delineation accuracy of the proposed method. While the second set focused on to quantifying the effectiveness of the proposed method in tree inventory parameter estimation, and is done on at the set of 100 individual trees with known location and DBH. For all experiments, tree tops were automatically detected by performing local maxima detection on the 3×3 Gaussian smoothened CHM. The kernel size of the Gaussian filter was chosen in an empirical way to minimize the omission and the commission errors in detecting tree crowns. The CHM had a maximum resolution of 10 cm, and was derived by subtracting the DEM from the DSM. The surface models were derived by interpolating points canopy and ground points in P.

Figure 5B:
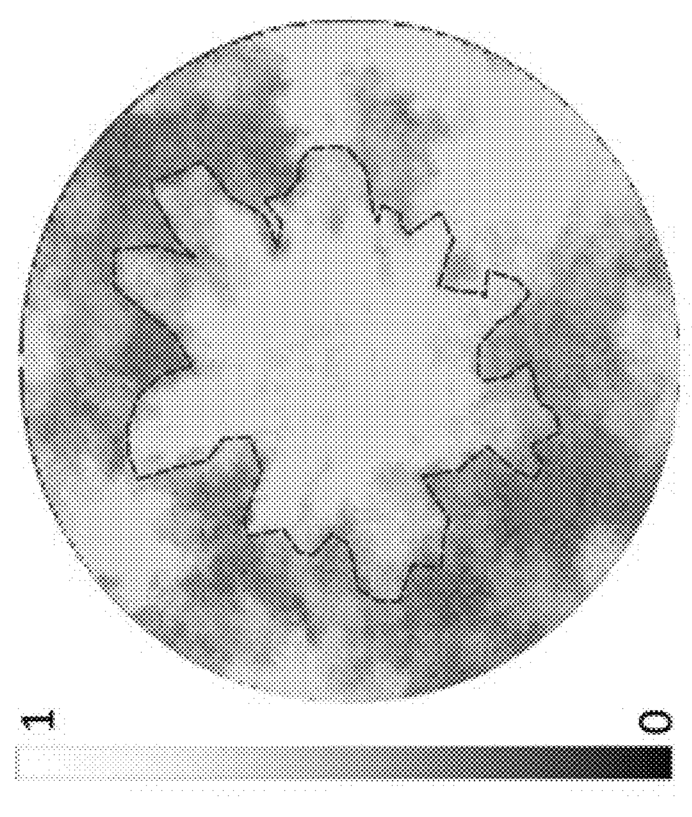
FIG. 5B illustrates an example fractional image obtained for a sample crown using a Fuzzy C-Means classifier with MRF-based spatial contextual terms
Figure 5A:
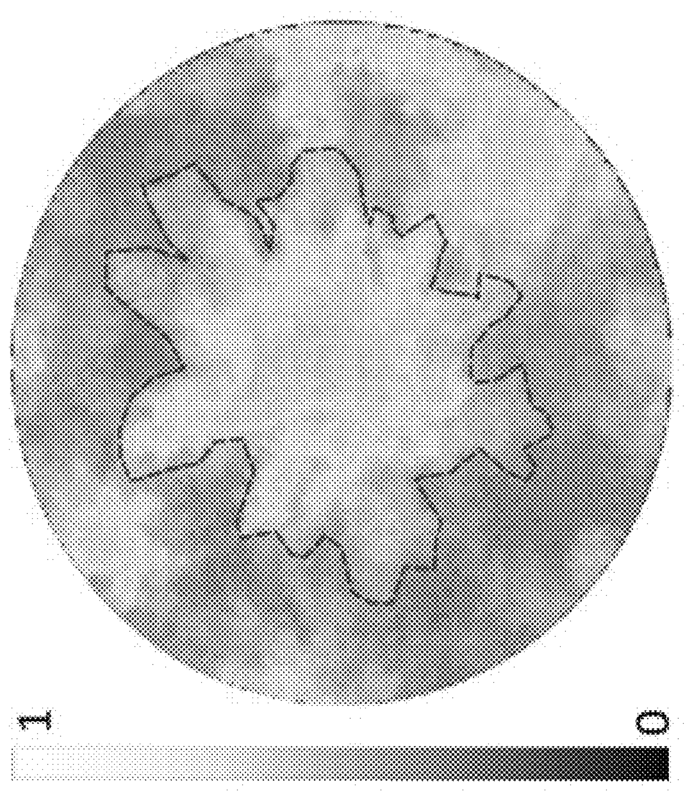
FIG. 5A illustrates an example fractional image obtained for a sample crown using a Fuzzy C-Means classifier without Markov Random Field (MRF)-based spatial contextual terms.
Figure 7:
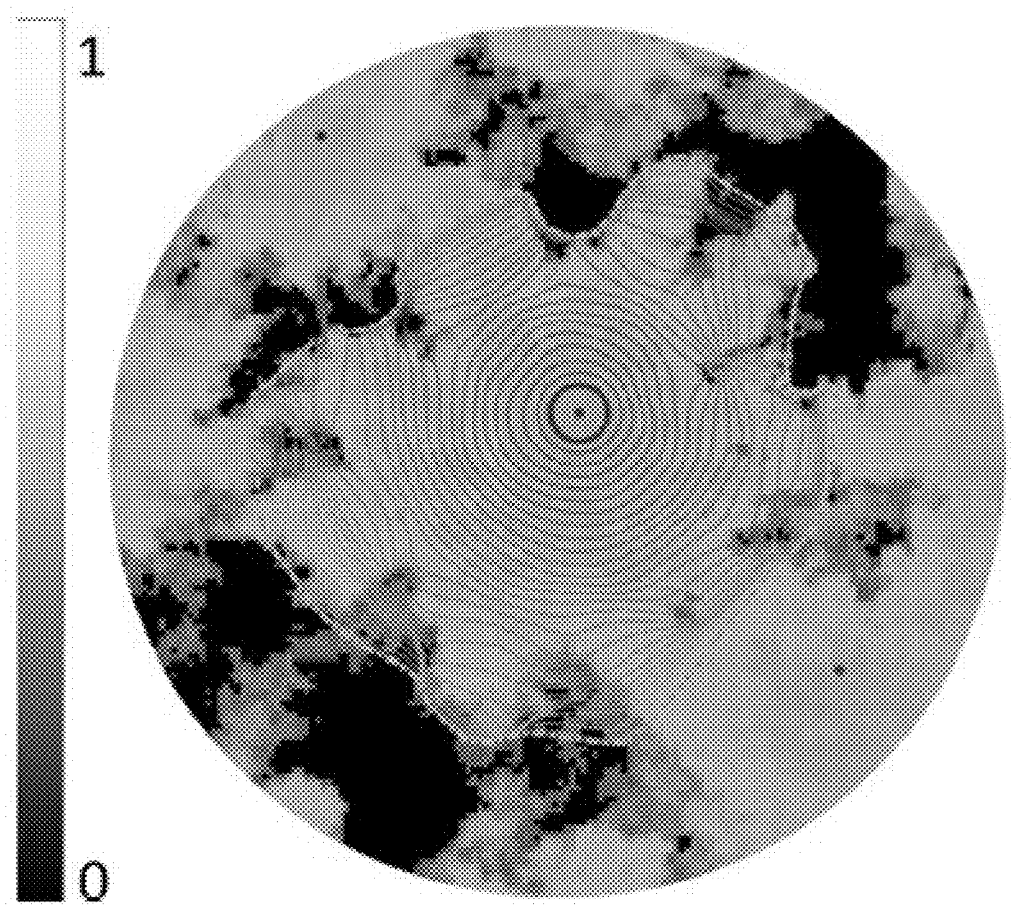
FIG. 7 illustrates an example of a circular seed contour placed with its center at a tree top, shown as a dot and is iteratively grown on the ridge integrated fractional map to detect crown boundary shown as a dotted line.
Figures 8A, 8B, 8C, 8D, 8E, 8F:
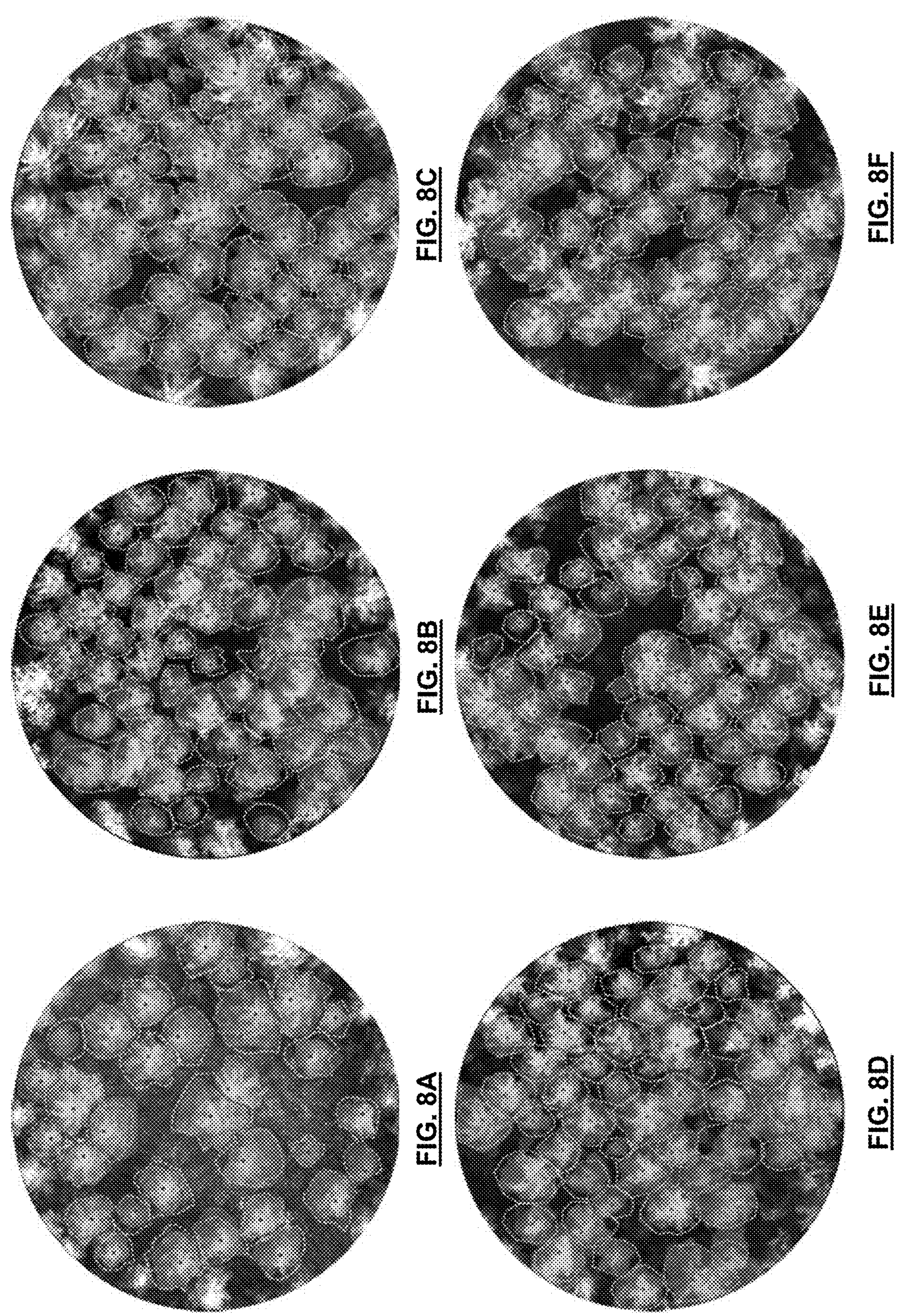
FIGS. 8A to 8F show crown polygons for six respective circular plots.

In the first set of example experiments, the watershed ridges $r_w$ map was derived using Marker-controlled Watershed segmentation using the detected tree tops as the markers. The delineation was performed on the fractional map of the crown derived from FCM-MRF classifier with a fuzzification factor m=2 and number of clusters C=2. The fuzzification factor was selected from the set {1.2,1.4,1.6,1.8, 2.0,2.2,2.4,2.6,2.8,3.0} with the objective of maximizing classification performance while minimizing the loss of edge information in the data measured using image entropy. The joint use of the spectral and the spatial contextual information in the data to generate fractional maps using the FCM-MRF classifier mitigates the effect of crown spectral variance and non-uniform illumination/shadowing. FIGS. 5A and 5B show the fractional image derive without and with the incorporation of spatial contextual term in FCM, respectively. The reference crown boundary is outlined. The relatively high spatial homogeneity in $u_{crown}$ derived from the FCM-MRF classifier (see FIG. 5A) minimizes errors in crown delineation. The ridge integrated fractional map $u_{rc}$ (FIG. 6C) is derived by multiplying $u_w$ (FIG. 6A) with $u_i$ (FIG. 6B). The zero likelihood values in $u_{rc}$ at the ridges together with the regions where $u_{crown} \geq u_{background}$ separates proximal crowns (see FIG. 6C). Finally, delineation of crowns was performed on the ridge integrated fractional map $u_{rc}$ using the GVF Snake algorithm by placing uniformly spaced g=100 seed-points on a circular path with radius d=0.1 m and center at the tree top. The iteration stopped at 100 iterations towards the crown boundary by performing an energy minimization on the seed point set. The thin plate energy $\beta$ and Membrane energy $\alpha$ were set as 1.5 and 0.2, respectively. The baloon force $\delta$ was set to 0.8 to minimize over segmentation. FIGS. 8A to 8F show the crowns detected and delineated by the system 200 for the six circular plots. The manually-delineated reference crown boundaries and tree tops are shown using dotted lines and dots, respectively. For each plot, the example experiments determined the Shared Crown Area (SCA), which is the percentage area of the reference polygon covered by the delineated crown polygon, and the Absolute Crown-Area Difference (ACD), which is the absolute difference in area between the delineated crown polygon and the reference polygon. The results are shown in TABLE 3.

TABLE 3

| Plot ID | SCA (%) | ACD ($m^2$) |
|---|---|---|
| Plot 1 | 79.5 | 1.8 |
| Plot 2 | 86.5 | 2.0 |
| Plot 3 | 88.0 | 1.9 |
| Plot 4 | 89.5 | 1.5 |
| Plot 5 | 83.3 | 1.7 |
| Plot 6 | 84.2 | 1.9 |

The second set of example experiments were focused on accessing the DBH estimation 9 accuracy of the present embodiments. The DBH of the individual trees for both the automatically delineated and the reference crowns were determined using Equation (11):

$$DBH_i = f\left(b_0 + b_1\sqrt{h_i} + b_2\sqrt{d_i}\right)^2 + \text{var}(\epsilon) \quad (11)$$

where $DBH_i$ is the estimated DBH (in millimeter) of the $i^{th}$ tree, and $h^i$ and $d^i$ are the tree height (in decimeter) and the crown diameter (in decimeter), respectively.

The model coefficients used for the Spruce are $b_0=-3.524$, $b_1=0.729$ and $b_2=1.345$. In general, the average RMSE in DBH estimation is found to be 6.1 cm. The small error in the DBH estimation shows the ability of the present embodiments to accurately delineate crowns. Considering the fact that variance in crown pixel values affects accurate segmentation, the DBH estimation of accuracy of trees was also determined based on the spectral homogeneity of the crown. The 100 trees were divided into three groups based on pixel homogeneity represented in term of image entropy. Group 1 and Group 3 consist of trees with most homogeneous and heterogeneous crowns in the dataset, respectively. While Group 2 has trees with crown reflectance that falls between Group 2 and Group 3. TABLE 5 shows the Mean Error (ME), the Mean Absolute Error (MAE) and the Root Mean Squared Error (RMSE) in DBH estimation for the three different group. Increasing heterogeneity in the crown affects the crown delineation accuracy and is reflected as higher RMSE. In general, the lower DBH estimation error associated with the proposed approach proves its ability to accurately delineate tree crowns in high-resolution multispectral data.

TABLE 5

| Image Entropy | ME (cm) | MAE (cm) | RMSE (cm) |
|---|---|---|---|
| Group 1 (4-5) | −0.90 | 4.42 | 5.24 |
| Group 2 (5-6) | −1.20 | 4.90 | 5.90 |
| Group 3 (≥6) | −2.87 | 5.94 | 7.80 |

Figure 9C:
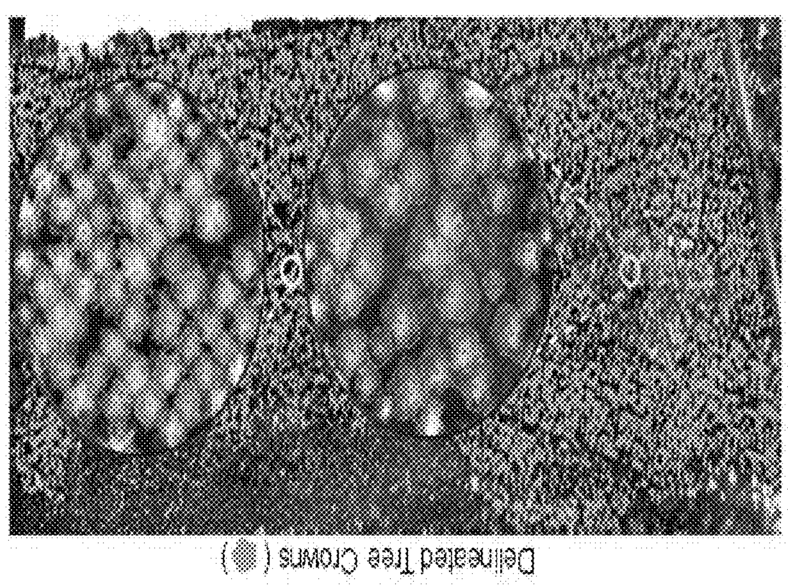
FIG. 9C illustrates delineated tree crowns for the forest scene of FIG. 9.
Figure 9B:
FIG. 9B illustrates detected tree tops for the forest scene of FIG. 9A.
Figure 9A:
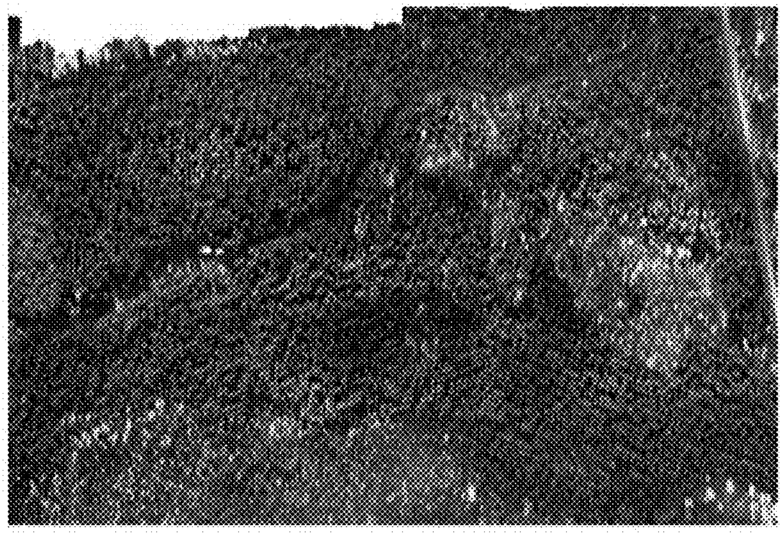
FIG. 9A shows an example of a spatially and geometrically preprocessed crown data from a forest scene.

FIGS. 9A to 9C show examples of outputs generated by the system 200. FIG. 9A shows 6 spatially and geometrically preprocessed crown data from a forest scene. FIG. 9B illustrates detected tree tops for the forest scene of FIG. 9A. FIG. 9C illustrates delineated tree crowns for the forest scene of FIG. 9A.

Advantageously, the example experiments show that the present embodiments provide an accurate and efficient approach for crown detection and delineation by exploiting both the spectral and the spatial information in very-high-resolution UAV based photogrammetric multispectral data. Fractional image of the crown class derived from the FCM-MRF classifier maximizes spectral homogeneity within the crown area, while maintaining the edge information. Segmentation of individual tree crowns performed using the GVF-Snake algorithm allows accurate delineation of individual tree crowns. The high SCA of 89.5% and the low ACD 1.5 $m^2$ obtained for the circular plots shows the ability of the proposed approach to accurately delineate individual crowns from the UAV data. The proposed method also allowed a 1.5 cm overall-reduction in the RMSE over other approaches, hence proving its capacity to be used for accurate vegetation parameter estimation.

The present embodiments, which use structural information, are particularly advantageous in terms of performance over other approaches that merely use spectral and spatial-contextual information. The present embodiments maximally exploit the crown structural information by deriving approximate crown boundaries, advantageously, in addition to detecting the treetops. The example experiments illustrated that delineation accuracy increases as additional features are used. The present inventors determined that the structural information can be used solve the problem of erroneous-crown delineation caused due to, for example, shadowing and noise in optical data.

Figure 10A:
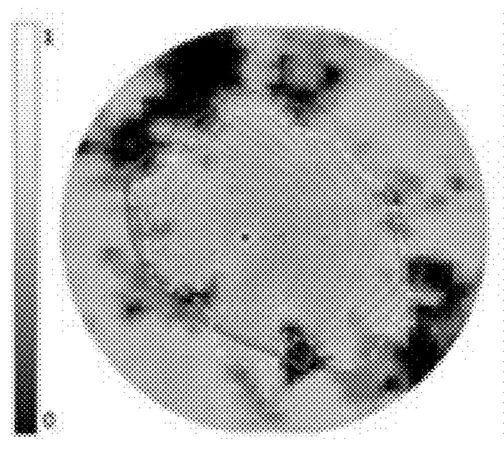
FIG. 10A illustrates an example tree-level generated fuzzy map for an approach that only uses spectral and the spatial-contextual information.
Figure 10B:
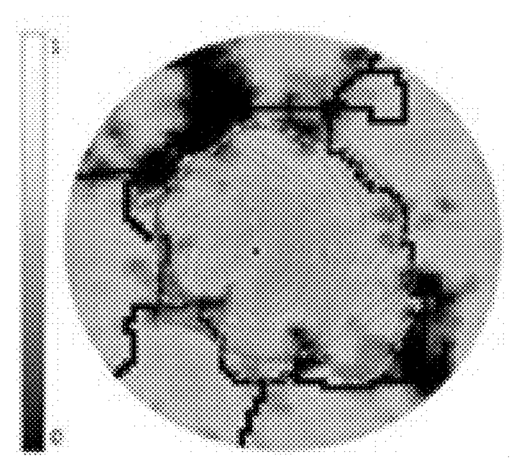
FIG. 10B illustrates an example tree-level generated fuzzy map for an approach that uses spectral, spatial-contextual and structural information, in accordance with the system of FIG. 1.
Figure 10C:
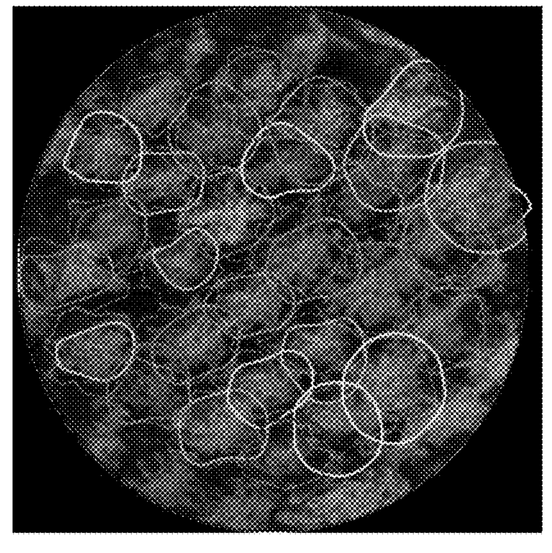
FIG. 10C illustrates a boundary delineation map for the approach of FIG. 10A.
Figure 10D:
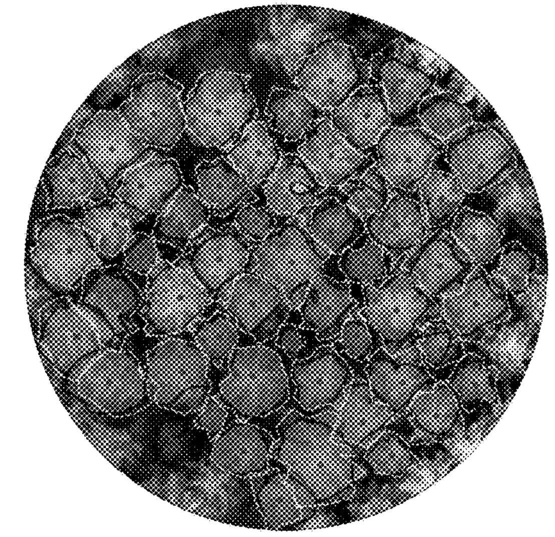
FIG. 10D illustrates a boundary delineation map for the approach of FIG. 10B.

FIGS. 10A and 10C illustrate an example tree-level generated fuzzy map and boundary delineation, respectively, for an approach that only uses spectral and the spatial-contextual information. FIGS. 10B and 10D illustrate an example tree-level generated fuzzy map and boundary delineation, respectively, for an approach that also uses structural information; in accordance with the present embodiments.

The structural information corresponds to the crown surface relief at the canopy-level, as described herein. In the example experiments, the CHM structural information was used to identify the crown boundaries (thick black lines in FIG. 10B) using watershed modelling. In embodiments of the present disclosure, the iteratively grown crown boundary was restricted by the GVF-Snake algorithm at the crown-span represented by the thick black line. This allows the final crown boundary to be more accurate even in the case of proximal crowns with partial crown-overlap. The joint use of accurately modelled structural information together with the spectral and spatial-contextual information, improves crown delineation accuracy. As illustrated in FIG. 10D compared to FIG. 10C, the boundary polygons detected by the present embodiments are substantially more accurate.

Although the invention has been described with reference to certain specific embodiments, various modifications thereof will be apparent to those skilled in the art without departing from the spirit and scope of the invention as outlined in the claims appended hereto.

The invention claimed is:

1. A computer-implemented method for vegetation detection from aerial photogrammetric multispectral data, the method comprising:

receiving the aerial photogrammetric multispectral data capturing a plurality of vegetation;

detecting apexes of individual vegetation in a height model of the aerial photogrammetric multispectral data using Local Maxima (LM) detection;

detecting vegetation as detected apexes in the height model above a predetermined threshold;

performing orthorectification on the aerial photogrammetric multispectral data to derive an orthomosaic;

generating a fractional map of a vegetation class by applying a Fuzzy classifier on the orthomosaic using the detected vegetation to define the class;

generating a binary ridge map using the height model to identify ridges;

combining the binary ridge map and the fractional map of the vegetation class to generate a ridge integrated fractional map;

performing delineation of individual vegetation on the ridge integrated fractional map on a vegetation class using an active contour algorithm; and outputting the delineated vegetation.

2. The method of claim 1, further comprising generating a dense three-dimensional point cloud using the aerial photogrammetric multispectral data and determining a Digital Surface Model (DSM) representative of surface geometry of the vegetation and a Digital Elevation Model (DEM) representative of underlying surface geometry from the dense three-dimensional point cloud, and wherein determining the height model comprises subtracting the DEM from the DSM.

3. The method of claim 2, further comprising preprocessing the aerial photogrammetric multispectral data comprising:

determining an orientation of the aerial photogrammetric multispectral data;

generating the dense three-dimensional point cloud using the determined orientation; and determining the DSM and the DEM using the three-dimensional point cloud.

4. The method of claim 1, further comprising generating a fractional map of a background class using the Fuzzy classifier on the orthomosaic, and removing values in the fractional map of the vegetation class when the membership of the respective value is more likely to be in the background class.

5. The method of claim 4, wherein the Fuzzy classifier comprises a Fuzzy C-Means classifier that uses a Markov-Random Field based spatial-contextual model (FCM-MRF).

6. The method of claim 1, wherein the vegetation class in the ridge integrated fractional map is determined as having a mean spectral value most proximal to a coarse mean spectral value, the coarse mean spectral value determined from the aerial photogrammetric multispectral data by averaging a predetermined number of brightest pixel values proximal to the detected apexes.

7. The method of claim 6, wherein the active contour algorithm comprises a Gradient Vector Field (GVF) Snake algorithm.

8. The method of claim 7, wherein the GVF snake algorithm starts the delineation from a seed points set generated from a boundary of a circle with a center placed around a detected apex, and performs a finite number of iterations such that vertices of the circle are shifted toward boundaries of the vegetation.

9. The method of claim 1, further comprising performing Gaussian smoothening on the height model.

10. The method of claim 1, wherein the vegetation comprises crops or trees.

11. The method of claim 10, wherein the vegetation comprises trees, the height model comprises a crown height model for crowns of the trees, and the detected apexes comprise detected tree tops.

12. A system for vegetation detection from aerial photogrammetric multispectral data, the aerial photogrammetric multispectral data capturing a plurality of vegetation, the system comprising one or more processors and a data storage, the one or more processors in communication with the data storage and configured to execute:

a preprocessing module to receive the aerial photogrammetric multispectral data, and to perform orthorectification on the aerial photogrammetric multispectral data to derive an orthomosaic;

a detection module to detect apexes of individual vegetation in a height model of the aerial photogrammetric multispectral data using Local Maxima (LM) detection, and to detect vegetation as detected apexes above a predetermined threshold in the height model; and a delineation module to:

generate a fractional map of a vegetation class by applying a Fuzzy classifier on the orthomosaic using the detected vegetation to define the class;

generate a binary ridge map using the height model to identify ridges;

combine the binary ridge map and the fractional map of the vegetation class to generate a ridge integrated fractional map;

perform delineation of individual vegetation on the ridge integrated fractional map on a vegetation class using an active contour algorithm; and output the delineated vegetation.

13. The system of claim 11, wherein the preprocessing module further generates a dense three-dimensional point cloud using the aerial photogrammetric multispectral data and determining a Digital Surface Model (DSM) representative of surface geometry of the vegetation and a Digital Elevation Model (DEM) representative of underlying surface geometry from the dense three-dimensional point cloud, and wherein determining the height model comprises subtracting the DEM from the DSM.

14. The system of claim 12, wherein the preprocessing module further preprocesses the aerial photogrammetric multispectral data comprising:

determining an orientation of the aerial photogrammetric multispectral data;

generating the dense three-dimensional point cloud using the determined orientation; and determining the DSM and the DEM using the three-dimensional point cloud.

15. The system of claim 11, wherein the delineation module further generates a fractional map of a background class using the Fuzzy classifier on the orthomosaic, and removes values in the fractional map of the vegetation class when the membership of the respective value is more likely to be in the background class.

16. The system of claim 14, wherein the Fuzzy classifier comprises a Fuzzy C-Means classifier that uses a Markov-Random Field based spatial-contextual model (FCM-MRF).

17. The system of claim 11, wherein the vegetation class in the ridge integrated fractional map is determined as having a mean spectral value most proximal to a coarse mean spectral value, the coarse mean spectral value determined from the aerial photogrammetric multispectral data by averaging a predetermined number of brightest pixel values proximal to the detected apexes.

18. The system of claim 16, wherein the active contour algorithm comprises a Gradient Vector Field (GVF) Snake algorithm.

19. The system of claim 17, wherein the GVF snake algorithm starts the delineation from a seed points set generated from a boundary of a circle with a center placed around a detected apex, and performs a finite number of iterations such that vertices of the circle are shifted toward boundaries of the vegetation.

20. The system of claim 11, wherein the detection module further performs Gaussian smoothening on the height model.

* * * * *